United States Patent [19]

Mann et al.

[11] Patent Number: 5,167,035
[45] Date of Patent: Nov. 24, 1992

[54] TRANSFERRING MESSAGES BETWEEN NODES IN A NETWORK

[75] Inventors: Bruce E. Mann, Mason, N.H.; Christian D. Saether, Seattle, Wash.; Philip J. Wells, Maynard, Mass.

[73] Assignee: Digital Equipment Corporation, Maynard, Mass.

[21] Appl. No.: 836,197

[22] Filed: Feb. 13, 1992

Related U.S. Application Data

[63] Continuation of Ser. No. 241,650, Sep. 8, 1988, abandoned.

[51] Int. Cl.$^5$ .................. G06F 13/00; G06F 13/42
[52] U.S. Cl. .................. 395/575; 371/33; 370/85.1; 370/94.1; 395/800; 395/200; 364/240.8; 364/240.9; 364/242.94; 364/261.2; 364/262.1
[58] Field of Search .................. 395/200, 800, 575; 364/DIG. 1; 370/32, 60, 85.1, 94.1; 340/825.06, 825.3, 825.53; 375/121; 371/33

[56] References Cited

U.S. PATENT DOCUMENTS

| | | | |
|---|---|---|---|
| 4,542,501 | 9/1985 | Chevalet et al. | 370/85 |
| 4,561,092 | 12/1985 | Shaver | 370/89 |
| 4,593,282 | 6/1986 | Lare | 340/825.5 |
| 4,617,657 | 10/1986 | Drynan et al. | 370/94.1 |
| 4,667,322 | 5/1987 | Ulug | 370/85 |
| 4,704,606 | 11/1987 | Hasley | 340/825.5 |
| 4,719,621 | 1/1988 | May | 370/85 |
| 4,727,537 | 2/1988 | Nichols | 370/85 |
| 4,751,700 | 6/1988 | Ulug | 370/85 |
| 4,787,027 | 11/1988 | Prugh et al. | 364/200 |
| 4,800,488 | 1/1989 | Agrawal et al. | 364/200 |
| 4,897,781 | 1/1990 | Chang et al. | 364/200 |
| 4,930,093 | 5/1990 | Houser et al. | 364/900 |
| 4,949,248 | 8/1990 | Caro | 364/200 |
| 4,975,904 | 12/1990 | Mann et al. | 370/85.1 |
| 4,975,905 | 12/1990 | Mann et al. | 370/85.1 |

FOREIGN PATENT DOCUMENTS

WO88/04511 6/1988 PCT Int'l Appl.

OTHER PUBLICATIONS

David Cheriton; VMTP: Versatile Message Transaction Protocol; Jan. 12, 1987.
David Cheriton, Carey L. Williamson; Network Measurement of the VMIP Request-Response Protocol in the V Distributed System; pp. 1-10.
R. Braden; Towards a Transport Service for Transaction Processing Applications; Sep. 1985; pp. 1-10.
J. G. Sims; "Node Processor For Distributed System Control," IBM Technical Disclosure Bulletin; vol. 23, No. 5, 1980.
Chun et al.; "Pilot Implementation of Session, Acse and CCR Protocols," IEEE; 1987.
Andrew S. Tanenbaum; "The Data Link Layer," Computer Networks; pp. 136-186; 1981.

Primary Examiner—Eddie P. Chan
Attorney, Agent, or Firm—Fish & Richardson

[57] ABSTRACT

A message transfer arrangement includes a client node and a server node interconnected by a data link. The client node sequentially receives requests from user applications and generates, in response to each request, command messages for transmission by the interface. Each command message includes a command, a transmit slot identifier identifying the request in the sequence of requests received by the request receiver, and a transmit sequence identifier identifying the channel message in the sequence of command relating to the request. The selection of whether to transmit a command message related to one request or to a subsequent request is based on a received slot identifier and a received sequence identifier in a response message. The server node receives command messages from, and transmits response messages to, the client node over the data link. It selectively executes the command contained in each command message and generates, in response thereto, a response message including a response slot identifier and response sequence identifier corresponding to the commanmd slot identifier and command sequence identifier. The determination of whether to execute a command in a command message is based on the command slot identifier and command sequence identifier of the received command message and the command slot identifier and command sequence identifier of the command message containing the previously executed command.

53 Claims, 8 Drawing Sheets

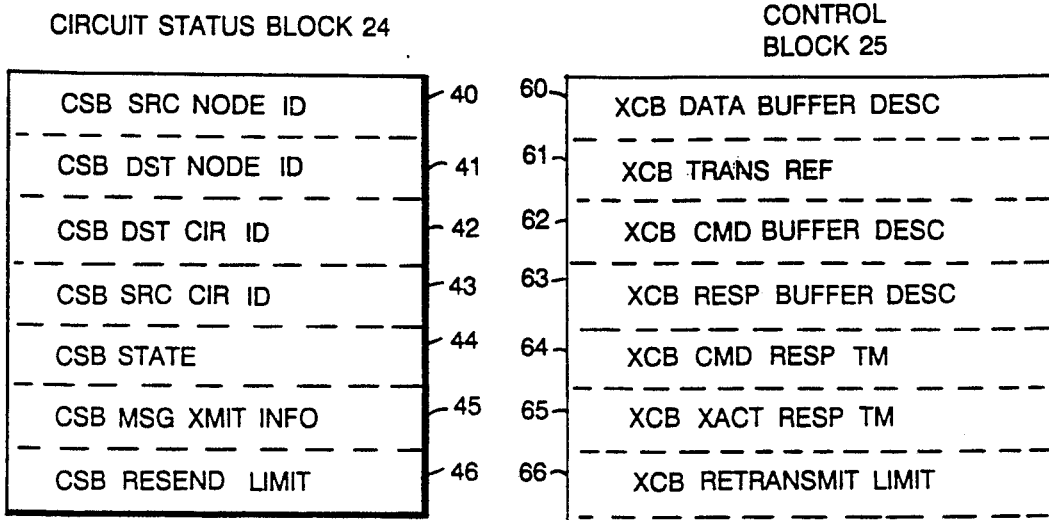
FIG. 3
FIG. 5
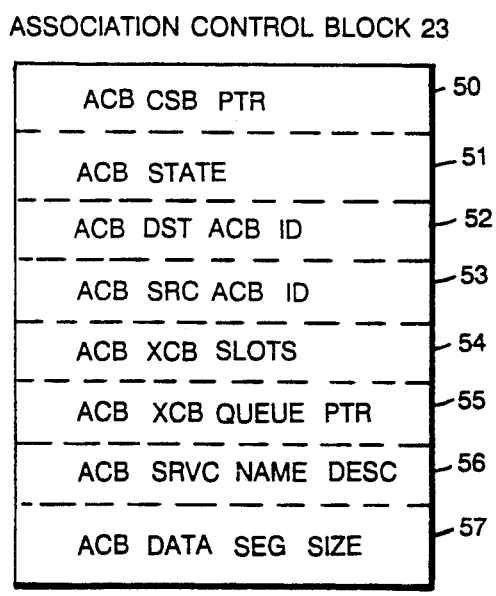
FIG. 4

TRANSFERRING MESSAGES BETWEEN NODES IN A NETWORK

This is a continuation of application Ser. No. 07/241,650, filed Sep. 8, 1988, now abandoned.

BACKGROUND OF THE INVENTION

The invention relates generally to the field of digital data processing systems and more particularly to information transfer arrangements in distributed systems.

As digital data processing systems, or computers, have become smaller and less expensive, individual computers are being used by individuals and small groups. To enhance sharing of data, communications among users and economy in connection with resources which may be infrequently used by an individual, computers have been connected into networks, which include, in addition to the computers used directly by the various users, servers which, for example, store large amounts of data which may be accessed, used and updated by a number of users in the system, thereby facilitating sharing of data. Servers may also control printers, telecommunications links, and so forth. In addition, servers may provide specialized computational services, such as database searching and sorting, and so forth. The various computers, which are termed clients, and servers are interconnected by a communications link to permit messages to be transferred among the various computers and servers comprising the distributed system.

SUMMARY OF THE INVENTION

The invention provides a new and improved information transfer arrangement for transferring messages, including commands and responses, among various elements in a distributed digital data processing system.

In brief summary, the arrangement includes a client node and a server node interconnected by a data link. The client node sequentially receives requests from user applications and generates, in response to each request, command messages for transmission by said interface, each command message including a command and having a transmit slot identifier identifying the request in the sequence of requests received by said request receiver and a transmit sequence identifier identifying the command message in the sequence of command messages relating to the request. The selection of whether to transmit a command message related to one request or to a subsequent request is based on a received slot identifier and a received sequence identifier in a response message.

The server node receives command messages from, and transmits response messages to, the client node over the data link. It selectively executes the command contained in each command message and generates, in response thereto, a response message including a response slot identifier and response sequence identifier corresponding to the command slot identifier and command sequence identifier. The determination of whether to execute a command in a command message is based on the command slot identifier and command sequence identifier of the received command message received by interface and the command slot identifier and command sequence identifier of the command message containing the previously executed command.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3 through 5 depict details of data structures shown in FIG. 2;

FIGS. 7A-1 through 7B depict flow diagrams detailing the operations of the distributed digital data processing system depicted in FIG. 1.

DETAILED DESCRIPTION OF AN ILLUSTRATIVE EMBODIMENT

Figure 1:
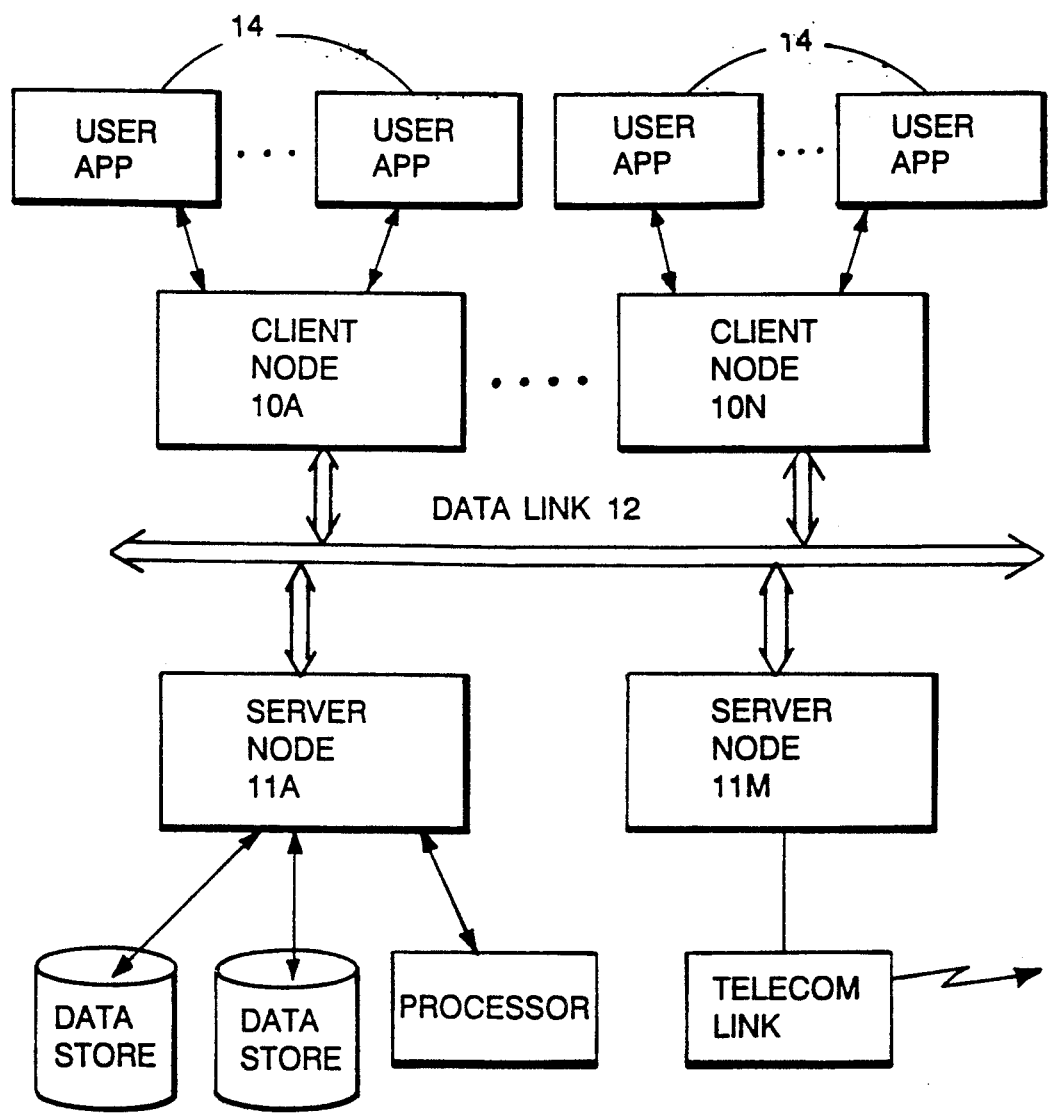
FIG. 1 is a general block diagram of a distributed digital data processing system constructed in accordance with the invention.

FIG. 1 depicts a general block diagram of a distributed digital data processing system constructed in accordance with the invention. With reference to FIG. 1, the system includes one or more client nodes 10A through 10N (generally identified by reference numeral 10) and one or more server nodes 11A through 11M (generally identified by reference numeral 11) interconnected by one or more interfaces 19 (shown below in FIG. 2) to one or more data links 12. A client node 10 may include, for example, a personal computer or computer workstation, which may be used by one or a few users, generally identified by reference numeral 13, which are using one or more programs identified herein as user applications 14. A server node 11 may, in response to messages from a client node 10 transmitted over data link 12, perform a number of data processing services. For example, a server node 11 may store large amounts of data, which may be shared among user applications processed by a plurality of client nodes 10. The client nodes 10 may, by means of messages transferred over data link 12, obtain stored data from the server node 11, process the obtained data and return, over the data link 12, processed data for storage by the server node.

A server node 11 may also control one or more resources which may be infrequently used by a user application. For example, a server node 11 may control one or more printers, links to the public telecommunications network, backup data storage system, or similar resource, which are generally infrequently used and thus may be shared among user applications. In addition, a server node 11 may provide specialized data processing services, such as specialized high-speed computation services or database services, which may comprise searching or sorting activities, upon request by a user application transmitted over the data link 12.

In the system depicted in FIG. 1, the server nodes 11 operate in response to command messages which they receive from the client nodes 10 over the data link 12. In response to each command message, the server node 11 performs a data processing operation identified by the command message and generates a response message, which it transmits, over the data link 12, to the client node which generated the command message.

Each server node 11 periodically broadcasts a service advertising message over the data link 12 identifying the various data processing services which it performs, as described in U.S. patent application Ser. No. 07/088,063, filed Aug. 24, 1987. The client nodes 10 receive the service advertising message, and establish a service directory as described in the aforementioned application. When a user application requests a service, the client node 10 selects the server node 11 to which it directs the command message to initiate the service based on the contents of the directory.

Specifically, each client node 10, in response to a request by a user application 14 requesting a particular data processing service selects, based on the contents of the directory, a server node 11 to provide the service. After selection of server node 11, the client node 10 first determines whether it has a circuit over data link 12 with the server node 11 over which it can transmit commands and receive responses, and, if not, establishes a circuit with the server node 11 by an exchange of messages over the data link 12.

After the client node 10 and server node 11 have established a circuit, the client node 10 determines whether an association exists with the server node 11 related to the service required by the user application 14. Each service provided by the server node 11 is associated with a different association. If an association does not exist, the client node 10 and server node 11, by means of another exchange of messages, establishes an association, the association having a predetermined fixed number of slots. Each slot can be used in connection with a request from a user application for the service associated with the association; thus, the number of slots identifies the number of concurrent requests that the server node 11 will handle for the client node 10 over the circuit.

When a client node 10 and server node 11 have a circuit and association established therebetween for the user application request, if the client node 10 has a free slot, it generates a command message, which is identified as being related to the circuit, association and slot and transmits it over the data link 12 to the selected server node 11 for processing.

In response to the receipt of a command message from a client node 10, the server node 11 performs the processing operation, as defined by the command message. If required by the command message, the server node 11 generates processed data, which it forms into a response message. If the command message does not require the server node 11 to return processed data, it may merely generate a response message indicating that the command message has been processed. The server node 11 transmits the response message over the data link 12 to the client node 10 that generated the command message. Upon receipt of the response message from the data link 12, the client node 10 supplies any processed data to the user application. The command message and response message form a transaction between the client node 10 and the server node 11 over the data link 12.

Every so often command messages and response messages transmitted over the data link 12 may be lost or delayed. If a command message or response message is lost, the receiving server node 11 or client node 10, respectively, does not receive it. On the other hand, if a command message or response message is delayed in transfer over the data link, it may be later received by the server node 11 or client node 10, respectively. To ensure that command messages relating to all user application requests are received and executed by a server node, the client node 10 iteratively transmits a command message relating to one request from a user application to the server node until it receives a response message thereto. The client node 10 includes, with the command message, a slot number identifying the request from a user application 14 and a sequence number which it increments each time it transmits the command message with the same slot number. The server node 11, in the response message, includes the slot number and the sequence number of the command message transmission to which it is responding.

If the client node 10 does not receive a response to a command message within a predetermined time interval, it transmits another command message, with the same slot number, but with the sequence number being incremented from the previous transmission. This serves to ensure that the response messages and command messages are synchronized as between the client node 10 and the server node 11.

The server node 11, when it receives a command message from a client node 10, including a slot number and sequence number, compares the slot number and sequence number to the slot number and sequence number of the previously-executed command message and proceeds based on the slot numbers and sequence numbers of the previously-executed command message and the command message that it just received. Specifically, if the slot number of the received command message is the same as the slot number of the previously-executed command message, the server node 11 uses the sequence number to determine whether to execute the command message. If the slot number of the received command message is the same as the slot number of the previously-executed command message, and if the sequence number of the received command message is greater than the sequence number of the previously-executed command message, the server node 11 executes the command message, and generates a response message identifying the slot number and sequence number of the just executed command message, along with any data required for the response. On the other hand, if the server node 11 determines that the sequence number of the previously-executed command message associated with the slot, that is, which has the same slot number, is the same or greater than the sequence number of the just-received command, the server node does not execute the just-received command message.

As noted above, the client node 10 and server node 11 use the slot number and sequence number each command message and response message in synchronizing command message transmission by the client node 10 and execution by the server node 11. The sequence number uniquely identifies each command message in a sequence of command messages associated with a slot identified by a slot number. By requiring the sequence number in a response message associated with a slot to match the sequence number of the most recently transmitted command message associated with the same slot, the client node 10 ensures that the server node 11 will not execute any command messages relating to this request after the request has been indicated as having been successfully completed to the user application 14.

Similarly, by limiting the server node 11 to only executing a command message if the sequence number is greater than the sequence number of the previously executed command message associated with the same slot, the server node 11 ensures that it does not execute a command message that has been delayed in transmission over the data link 12. The arrangement also requires less resources in the server node 11 to implement. In particular, it will be appreciated that the message protocol, including the command messages and response messages, do not require acknowledgement messages to be generated and transmitted, the server node 11, as well as the client node 10, do not need to spend time to generate the acknowledgement. In addition, the server node 11 need not run timers to time acknowledgement intervals, or to buffer responses should the need arise to perform a retry, since retries are effectively performed by the client node transmitting another command, with the same slot number, but with an incremented sequence number.

It will be appreciated that this arrangement will find great utility in connection with services that are idempotent, that is, for which iterative execution provides the same result. Examples of such services include writing data to a selected area of a disk storage unit and reading data from a selected area of a disk storage unit. Writing the same data to a selected area of a disk storage unit multiple time results in the same data being stored on that area, since the same data is written each time. Similarly, reading data from a selected area of a disk storage unit also results in the same data being read since reading the data does not result in a change to the read data.

In the system depicted in FIG. 1, each command message transmitted over the data link 12 by a client node 10, and each response message transmitted over the data link 12 by a server node 11, includes one or more message segments. Each message segment includes, in addition to command message identification information, which includes the slot number and sequence number, a segment identification number. The server node 11 receiving segments comprising a command message and the client node 10 receiving the segments comprising a response message assemble the command message and response message in the order identified by the segment identification number. Thus, a client node 10 and server node 11 may have a plurality of connections to the data link 12, each of which can independently receive message segments from the data link, and the client node 10 and server node 11 may assemble the complete command message and response message from message segments received over the various interfaces. This permits a server node 11 and client node 10 to have some redundancy in interfaces to the data link 12 so that, if one interface fails, another can be operative.

Each message segment further includes congestion control information in addition to the slot number, sequence number and segment number. When each client node 10 and server node 11 initially establish communications therebetween, thereby permitting the client node 10 to transmit command messages to the server node 11, each node communicates to the other node a rate value that indicates the rate at which the other node may transmit message segments thereto. Each subsequent message segment includes the congestion control information which may alter the previously-established rate value. If a server node 11, for example, determines that command message segments are arriving at too fast a rate, such that it may become congested, it inserts congestion control information into the response message segments that it transmits, which reduces the rate at which the client nodes 10 that receive the response message segments may transmit command message segments to the server node 11. If the congestion thereafter abates, the server node 11 transmits congestion control information in the response message segments that permits the recipient client nodes 10 to increase the rate at which they may transmit command message segments to the server node 11.

Similarly, if a client node 10 determines that response message segments are arriving at too fast a rate, such that congestion may occur, it inserts congestion control information in the command message segments that it transmits which reduces the rate at which the server nodes 11 that receive the command message segments may transmit server message segments to the client node 10. If the congestion thereafter abates, the client node 10 transmits congestion control information in the command message segments that permits the recipient server nodes 11 to increase the rate at which they may transmit response message segments to the client node 10.

The congestion control arrangement permits the client nodes 10 and server nodes 11 to initially set the rate value to a large value and thereafter adjust the rate at which message segments are transmitted thereto on an instantaneous or adaptive basis to accommodate the dynamics of message transmission over the data link 12.

Figure 2:
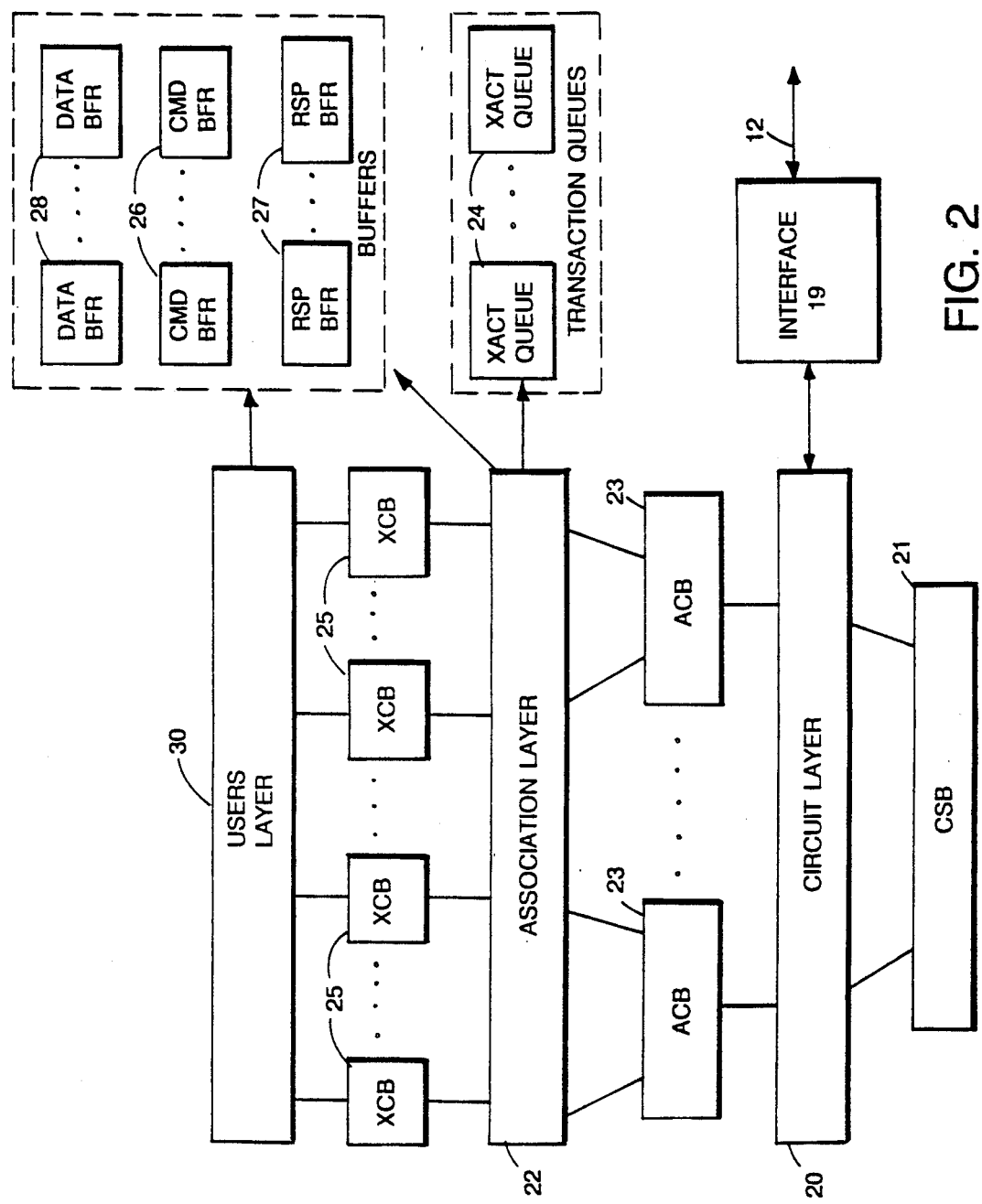
FIG. 2 is a functional block diagram of a node in the distributed digital data processing system depicted in FIG. 1.

With this background, the structure and operation of the client node 10 and server node 11 will be described in detail in connection with FIGS. 2 through 7B. FIG. 2 depicts the functional block diagram of a client node 10 in the distributed digital data processing system depicted in FIG. 1; the functional block diagram of a server node is similar. With reference to FIG. 2, the client node 10 includes a circuit layer 20 that generates messages for transmission by one or more interfaces 19 over one or more data links 12. In one specific embodiment, the data link 12 includes an Ethernet networking system as defined in IEEE Std. 802.3, although other data links may be used. The client nodes 10 and server nodes 11 transfer message segments, and in generating each message segment, the circuit layer 20 uses information in one or more circuit status blocks 21, each of which defines the client node's end of a circuit defined in connection with a server node 11. The detailed structure of a circuit status block will be described below in connection with FIG. 3. The client node 10 includes a circuit status block 21 for each circuit over which it transfers circuit messages.

As described above, each command message segment forms part of a command message from the client node 10. Otherwise stated, the client node 10, and specifically an association layer 22, divides a command message into one or more command message segments, with each command message segment being included in a circuit message generated by the circuit layer 20. The association layer 22 maintains a set of association control blocks 23, as described below in connection with FIG. 4, which define associations with the server nodes 11. For each association control block 23, the association layer 22 maintains a transaction queue 24 which identifies user application requests for each association.

Each queue element in a transaction queue 24 identifies a transaction control block 25 established by the association layer 22 to define, and provide the status of, a transaction. The detailed description of a transaction control block will be presented below in connection with FIG. 5. In brief, however, the transaction control block includes a pointer to a command message buffer 26, in which a command message is stored defining a request, a pointer to a response message buffer 27, in which the response message, in particular status and other information, will be placed, and a pointer to a data buffer 28 in which data for the command message is placed, either upon creation of the request, if data is to be transferred to the server node 11 or upon receipt of the response message if processed data is to be transferred by the server node 11 to the client node 10.

The command message is inserted into the command message buffer 26 by a users layer 30, which receives a request from a user application 14 to initiate a transaction. Upon notification by the association layer 22 of the receipt of a response message, the association layer inserts the response into the response message buffer 27 and, if it includes processed data, the processed data in the data buffer 28, both of which are identified by the transaction control block 25 associated with the transaction. Thereafter, the association layer 22 enables the users layer 30 to notify the user application 14 of the receipt of the response message. The user application 14 can then retrieve the response from the response message buffer 27 and use the data, if any, in the data buffer 28.

As noted above, a server node 11 has a structure similar to that shown in FIG. 2, including an interface 19 connected to the data link 12, a circuit layer 20 and associated circuit status blocks 21, association layer 22 and associated association control blocks 23, and transaction control blocks 25. The server node 11 also includes a servers layer which is analogous to the users layer 30, for controlling the services provided by the server node 11. In addition, the server node 11 includes buffers similar to the buffers 26–28 depicted in FIG. 2. The server node 11 also includes a block (not shown) which receives notification, either from service processes (not shown) which actually provide the services or from the services layer, of the various services and generates the service advertising message for transmission by the server node's interface over the data link 12.

A circuit status block 21, association control block 23 and transaction control block 25, include a plurality of fields which are depicted in FIGS. 3 through 5, respectively. As described above, the circuit status block 21 in the client node 10 defines the client node's end of a circuit. With reference to FIG. 3, the circuit status block 21 includes source and destination node identification fields 40 and 41, respectively. The source node identification field 40 contains one or more interface addresses on one or more data links 12 of the source node in the circuit; that is, if the circuit status block 21 is in the client node 10, the source node identification field 40 contains the interface address of the client node 10 and the data link 12 over which they may be reached, and if the circuit status block 21 is in the server node 11, the source node identification field 40 contains the interface addresses of the server node 11 and the data link 12 over which they may be reached. The destination node identification field 41 contains the interface addresses of the node which forms the other end of the circuit and the data links over which they may be reached. In addition, each field 40 and 41 contains an incarnation value, that is, a value which is unique each time the node is initialized. The addresses in the fields 40 and 41 thus uniquely identify the nodes in space and the incarnation uniquely identifies the incarnation node in time.

Figure 6A:
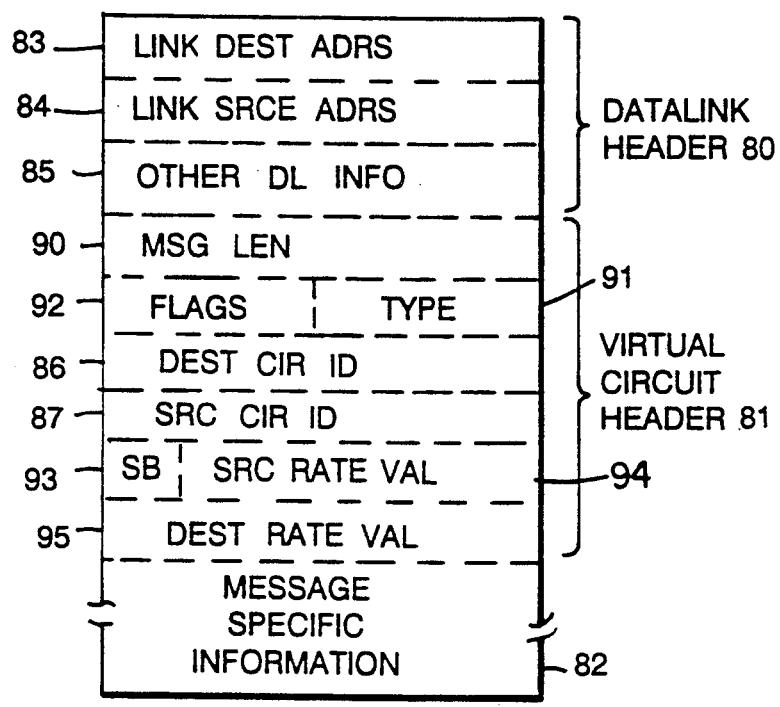
FIGS. 6A through 6F depict detailed structures of messages transferred among, nodes in the distributed digital data processing system depicted in FIG. 1.

The contents of the destination node identification field 41 and the source node identification field 40, both the addresses and the incarnation values, are used in fields in a message segment transmitted over the data link 12, as described below in connection with FIG. 6A, and are used by the interfaces 19 in the various nodes in determining whether a message segment received over data link 12 is intended for the particular node and the particular incarnation. Thus, if the incarnation value is incorrect, the receiving node ignores it.

The circuit status block 21 also includes two fields, namely a destination circuit identification field 42 and a source circuit identification field 43, which contain circuit identifications provided by the server node 11 and client node 10 during establishment of the circuit. As described below in connection with FIG. 6A, the contents of fields 42 and 43 are also used in a message segment transmitted using the circuit, and are used by the circuit layer 20 in determining the circuit, and thus the circuit status block, associated with the message segment. The contents of a state field 44 indicate whether the circuit is in a halted state, a starting up state or a running state. If the contents of the state field 44 indicate that the circuit is in a running state, message segments defining command messages and response messages may be transmitted thereover.

The circuit status block 21 also includes fields which contain information as to message transmissions thereover. For example, a message transmission information field 45 may contain such information as the rate at which the client node 10, and specifically the circuit layer 20, may transmit command message segments through interface 19. In addition, a resend limit field 46 contains a default value identifying a number of times a command message may be sent before a transmission failure is indicated. The default value is used if another retransmit value has not been provided in the association control block 23, as described below.

The association control block 23 in a client node 10 contains information defining the client node's end of an association with a server node 11 over a circuit. The association control block 23 includes a number of fields, including a circuit status block pointer 50, which points to a circuit status block 21 which defines the node's end of the circuit that is related to the association, that is, the circuit used to transmit command or response message segments for the association. A state field 51 indicates the state of the association, that is, whether the association is halted, starting, aborting or running. If the association is in the running state, the association layer 22 can generate command message segments, if in a client node 10, or response message segments, if in a server node 11, for transmission by the circuit layer 20 using the related circuit, that is, the circuit identified by the circuit status block pointer in field 50.

The association control block 23 also includes two association identifier fields, namely, a destination identification field 52, which contains the identification of the association provided by the other node providing the association, and a source identification field 53, which contains the identification of the association provided by the association layer 22 in the node in which the association control block 23 resides. The contents of these fields 52 and 53 are used in formation of a command message segment for transmission over the data link 12, and in identifying the association related to a response message segment received over the data link 12.

The association control block 23 further includes information relating to the transaction queue 24 (FIG. 2) whose entries point to transaction control blocks 25 that, in turn, identify the command message buffers 26 containing user application requests for transmission using the association. A slots field 54 identifies the maximum number of transaction slots that may be supported by the association, which corresponds to the maximum number of concurrent user application requests that can be accommodated over the association. The associated transaction queue 24 stores information relating to other user application requests, beyond those that can be accommodated by the slots. As user application requests are processed, requests in the transaction queue 24 related to the association are assigned a slot. A queue pointer field 55 identifies the transaction queue 24 associated with the association.

The association control block 24 also includes a field 56 that serves to identify the name of a service provided by the server node and related to the association. Each association is related to one service provided by a server node 11, as identified in the service advertising messages from the server node 11. The various services provided by the server node 11 each have a service name. The service field 56 includes a descriptor, which points to the beginning of a text string that contains the service name, and identifies the number of characters in the service name. Finally, the association control block includes a field 57 that identifies the maximum size of a message segment. The association layer 22 uses the contents of segment size field 57 in dividing a command or response message into fixed size command or response message segments.

The transaction control block 25 in the client node 10 includes information identifying the user application request and the response message buffer 27 into which the processed data from the response message segments from the server node 11 will be placed by the association layer. The association layer 22 establishes the transaction control block 25 and links it to a transaction queue 24 when it receives notification of a user application request from the user layer 30.

The detailed structure of a transaction control block 25 is depicted in FIG. 5. With reference to FIG. 5, a transaction control block 25 includes several descriptors, including descriptors 60, 62 and 63. A data buffer descriptor field 60 contains a descriptor of a data buffer 28 containing data, if any, which is used in connection with the request. For example, if the request relates to transfer of data to the server 11, the buffer contains data to be transferred to the server 11. Similarly, if the request relates to transfer of data from the server 11 to the client node 10, for use by the user application 14 that generated the request, the association layer 22 places the data in the data buffer 28, and a response message status indication in the response buffer 27. The transaction control block 25 also includes descriptors 62 and 63 for the command message buffer 26 and response message buffer 27 associated with the transaction. Each descriptor 60, 62 and 63 includes a pointer to the beginning of the respective buffer, and a value identifying the length of the buffer.

The transaction control block also includes a transaction reference field 61, which receives a transaction reference value supplied by the user application 14 that generated the request. As described below in connection with FIG. 6B, the contents of the transaction reference field 61 are used in forming message segments relating to the request. The users layer 30 also uses the transaction reference value in communication with the user application 14 concerning status of the request.

The transaction control block 25 also includes several fields relating to timers that time response messages and initiate transmission of a second command message related to the request associated with the transaction control block 25, including a command response time field 64, a transaction response time field 65, and a timer field 67. The timer field 67 contains the actual timer that identifies the amount of time since the last transmission of a command message based on a user application request associated with the transaction control block 25.

The command response time field 64 contains a timeout value identifying the maximum time permitted following transmission of a command message before a response message is expected. If the timing value in the timer field 67 exceeds the timeout value in the command response time field 64, the association layer 22 may generate another command message for the request, the command message having the slot number associated with the request but an incremented sequence number. A retransmit limit field 66 contains a value that identifies the number of times the client node will iteratively generate command messages associated with the request, before providing a failure indication to the user application 14 that generated the request.

The transaction response time field 65 contains another timeout value. The server node 11 may, in response to receipt of a command message from a client node 10, transmit a response re-synchronization message to the client node 10, indicating that it has received the command message and that it will execute it, and later transmit a response message. This permits the server node 11 to provide an early initial response to the client node 10 if the processing of the command message may require a significant amount of time. If the client node 10 receives either a response message or a response re-synchronization message from the server node 11 in response to a command message within a time identified by the command message response message timer field 64, it then resets the transaction timer 67 to the value identified in the transaction response timer field 65. The timing value established by the transaction response timer field 65 is normally greater than that established by the command response timer field 64, and may be used if the command requires lengthy processing by the server node 11. The timer 67 in the client node 10 may be iteratively reset by the server node 11 by iterative transmissions of response re-synchronization messages. If the timer 67 times out, the client node 10 transmits another command message based on the user application request, the command message having the same slot number and an incremented sequence number.

If the server node 11 provides a response re-synchronization message to a command message received from a client node 10, the client node 10 expects to receive the actual response message to the command message within a time, following transmission of the command message, specified by the timeout value in the transaction response time field 65. If the client node 10 receives the response message prior to expiration of the timeout period specified by the transaction response time field 65, it determines that the response message has been properly received; otherwise, it transmits another command message for the user application request, the command message having the same slot number and an incremented sequence number.

The transaction control block 25 also includes several additional fields. A segment bitmask field 70 includes a bit map of the various message segments comprising the response message, with the conditions of the bits in the bit map identifying the segments that have been received. An association control block pointer field 71 contains a pointer that identifies the association control block of the association related to the transaction. Finally, a circuit status block pointer field 72 contains a pointer that identifies the circuit status block 21 of the circuit used to transmit the command message and response messages between the client node 10 and the server node 11.

As described above, the client node 10 and server node 11 transmit command messages and response messages, respectively, using one or more message segments. The formats of various types of message segments will be described in connection with FIGS. 6A through 6F. With reference to FIG. 6A, a message segment includes three general portions, namely, a data link header 80, a circuit header 81 and an information field 82.

The information field 82 of a message segment is generated by the association layer 22, either in response to the receipt of a request to establish an association control block and related association or using the contents of a transaction control block 25 and an established association control block 23. The association layer 22 passes the information field 82 to the circuit layer 20, along with a pointer to a circuit status block 21. The circuit layer 20 receives the information field 82 and appends the data link header 80 and circuit header 81, using the contents of the circuit status block 21 identified by the pointer from the association layer 22.

The data link header 80 includes such information as the identification of the node that is the intended recipient of the message segment, in a link destination address field 83, and the identification of the node that transmitted the message segment, in a link source address field 84. A field 85 may be provided that includes other information required by the specific data link.

The circuit header 81 includes information that identifies the node incarnation, the circuit used to transfer the message and other information, including the type of message being transmitted. The contents of a destination circuit identification field 86 and a source circuit identification field 87 serve to identify the circuit, and in particular correspond to the contents of the destination node's circuit identification field 42 and the source circuit field 43 in the circuit status block 21 (FIG. 3). A message length field 90 identifies the length of the message segment.

The circuit header 81 also includes, in a type field 91, a message segment type identification. In one embodiment, a message segment may be identified as having one of several types. A message segment having a start type or a stop type is used to initialize a circuit or to eliminate the circuit, respectively. A message segment having a service advertising type is used by server nodes 11 to advertise services provided thereby, as described above. A message segment having a run type is used by client nodes 10 and server nodes 11 for a number of message sub-types. A run message segment having a command message, response message or re-synchronization message sub-type identifies the message segment as including a portion of a command message, response messages and response re-synchronization messages as described above. In addition, a run message segment having a command message connect sub-type or response message connect sub-type carries additional initialization information permit client nodes 10 and server nodes 11 to thereafter transmit command message and response messages using the circuit. Finally, a run message segment having a command message disconnect and response message disconnect message disables further transmissions of command message and response messages using the circuit.

The circuit header 81 also includes several flags. A flags field 92 indicates whether the data in the message segment is protected using any of a number of conventional error correction or detection arrangements. In addition, a congestion flag 93 indicates whether the circuit header includes, in a source rate value field 94, a new message segment transfer rate value. If the congestion flag indicates that the circuit header 81 includes a new message segment transfer rate value, the contents of the new rate value field are used by the node receiving the message in limiting the rate of message transmissions using the circuit. A destination rate value field 95 also identifies the message segment transfer rate value for the node which generated the message segment. Procedures used to determine the rate values to be provided in the new rate value field 94 are described below.

As described above, the client nodes 10 and server nodes 11 transmit several types of message segments, as indicated by the contents of the type field 91 (FIG. 6A), including a start type to initiate a circuit, a run type to transmit command messages and response messages, a stop type to eliminate a circuit, and a service advertising message type. A start message, which includes one message segment of the start type, contains, in field 82, information useful in establishing a circuit, such as circuit identifications and maximum segment size. A client node 10 initiates the establishment of a circuit with a server node 11 by transmitting a start message thereto, which includes the source circuit identification in field 87 as contained in field 43 in the circuit status block 21 identifying the circuit assigned by the client node 10. Contemporaneously, the state of the circuit, as indicated by the contents of field 44 of the circuit status block, shifts from halted to starting.

In response to the receipt of a start message, the server node 11, if it agrees to establish the circuit, establishes a circuit status block 21, loads the identification of the client node, the incarnation value and the circuit identification from the start message therein, assigns the circuit its identification, and transmits a start message that includes, in source circuit identification field 87 its circuit identification, and in the destination circuit identification field 86 the client node's circuit identification which it received in the source circuit identification field of the message from the client node 10. The client node 10 receives the responding start message from the server node 11 and loads the server node's identification, incarnation value, and its circuit identification into the fields 41 and 42 of the circuit status block, and changes the status of the circuit, as indicated by the contents of field 44 of the circuit status block 21, to the running state.

Figure 6B:
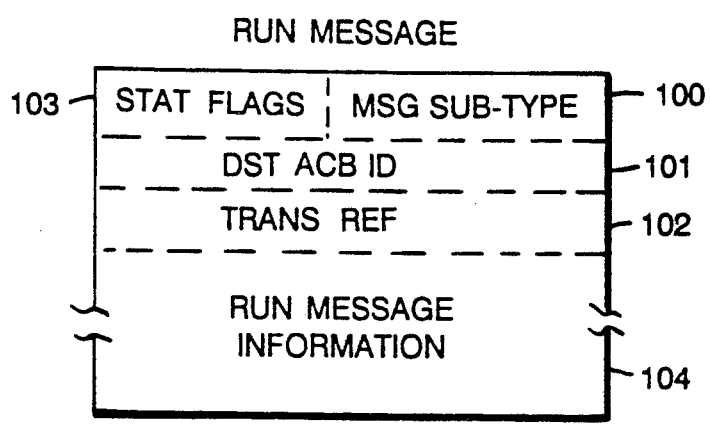

When the circuit is in the running state, the client node may transmit run messages thereover. The structures of run messages will be described below in connection with FIGS. 6B through 6F. FIG. 6B depicts the general structure of a run message, and FIGS. 6C through 6F depict structural details of the various sub-types of run messages. With reference initially to FIG. 6B, a run message includes a sub-type identification field 100, which identifies the sub-type of the message, a destination association control block field 101, which identifies an association control block 23, and a transaction reference field 102 which may include a transaction reference value corresponding to the contents of the transaction reference field 61 in a transaction control block 25. The run message also includes a status flag field 103, which contains various status flags, and a run message information field 104 which contains additional run message information. Specifically, the run message information field 104 contains information as depicted in FIGS. 6C through 6F for the various sub-types of run messages.

Figure 6C:
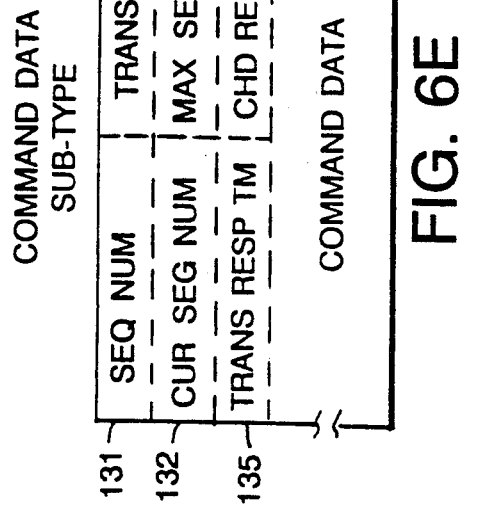
Figure 6E:
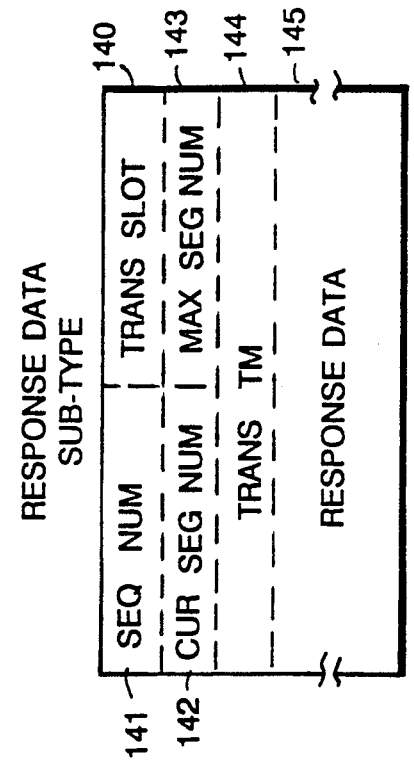
Figure 6D:
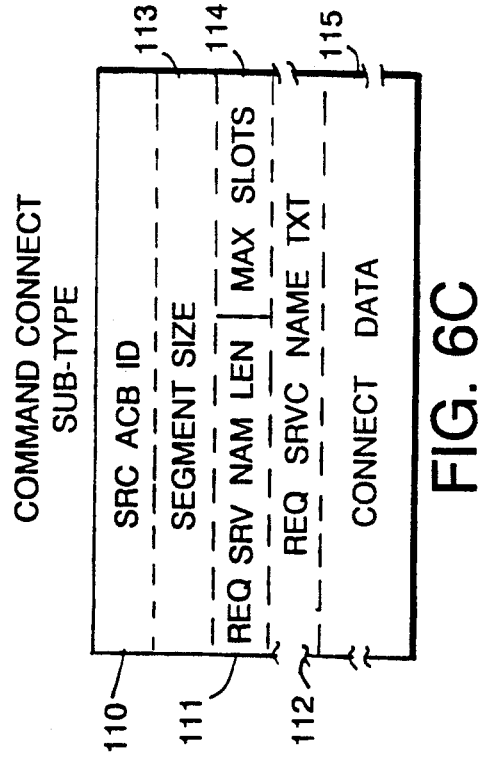

The contents of the destination association control block field 101 associate the run message with an association defined by the association control block 23 identified thereby, which, in turn, associates the run message with a particular service provided by the server node 11 to which the message is directed, as identified by the contents of the data link header 80 and circuit header 81. In addition, the contents of the transaction reference field 102 associate the run message with a transaction defined by a particular transaction control block 25. To establish an association, after the circuit is established as described above, the client node 10 transmits a run message of the command connect sub-type, and the server node 11 responds with a run message of the response connect sub-type. FIG. 6C depicts the contents of the run message information field 104 of a run message of the command connect sub-type, and FIG. 6D depicts the contents of the run message information field 104 of a run message of the response connect sub-type.

With reference to FIG. 6C, the run message information field 104 of a run message of the command connect sub-type includes a source association control block identification field 110, which identifies an association control block 23 in the client node 10, a request service name length field 111 and a request service name text field 112. The contents of the request service name text field 112 identify a service provided by the server node identified in the data link header 80 of the message, and the contents of the request service name length field 111 indicate the length of the text in the request service name text field 112. The contents of the request service name text field 112 are taken from the service name identified by the service name descriptor field 56 in the association control block 23 (FIG. 4).

The run message information field 104 of a run message of the command connect sub-type also includes additional information. In particular, the field 104 includes a segment size field 113, which identifies the maximum size of a message segment transmitted by the client node 110, a maximum slots field 114, which identifies the maximum number of slots in connection with the association, and a field 115 which may contain additional data useful in establishing the association.

The server node 11, and particularly its association layer 22, upon receiving a run message of the command connect sub-type, if it can support the association, establishes an association control block 23 in which it stores information from the message, assigns a name to the association, which it loads into the field 53 of the association control block 23 (FIG. 4) and transmits a run message of the response request sub-type to the client node 10. The contents of the run message information field 104 of that message are depicted in FIG. 6D. With reference to FIG. 6D, the field 104 includes a destination association control block 120 that includes the server node's name for the association, which the client node 10 loads into destination association control block identification 52 of its association control block 23 (FIG. 4). The contents of a destination service name length field 121 and a destination service name text field 122 are identical to the contents of fields 111 and 112 of the command connect sub-type to which the response connect sub-type is the response, and are used by the client node 10 to associate the response connect sub-type message to the command connect sub-type message that it transmitted earlier.

The run message of the response connect sub-type, which is transmitted by a server node 11, further includes a segment size field 123 and a maximum slots field 124. If the contents of either of these fields are lower than the contents of corresponding fields 113 and 114 of the run message of the command connect sub-type to which the message is a response, the client node 10 uses the lower values. The values are used in data segment size field 57 and the transaction control block slots field 54 of the client node's association control block 23.

The run messages of the command connect sub-type and of the response connect sub-type, in addition to initiating creation of the association control blocks 23 in the client node 10 and the server node 11, thus allow the nodes 10 and 11 to exchange identifications for the association, which are stored in fields 52 and 53 of the association control block and used in field 101 (FIG. 6B) of later run messages related to the association. Thus, by identifying the association in succeeding run messages, the particular service required by a client node 10 and provided by the server node can be identified by the contents of the destination association control block identification field 101 (FIG. 6B). In addition, these messages allow the nodes 10 and 11 to negotiate values for the size of a message segment, as indicated by the contents of fields 113 and 123 and stored in field 57 of the nodes' association control block 23, and the maximum slot value, as indicated by the contents of fields 114 and 124 and stored in field 54 of the nodes' association control block 23.

After an association has been established, the client node 10 may transmit a run message segments comprising a command message to the server node 11 over the data link 12. The contents of run message information field 104 (FIG. 6B) comprising a run message segment of a command message are depicted in FIG. 6E. With reference to FIG. 6E, the field 104 includes slot and sequence number information in field 130 and 131, respectively. Thus, the contents of the transaction reference field 102 (FIG. 6B) and of transaction slot field 130 associate the run message segment with a particular request from a user application 14, and the contents of sequence number field 131 associate the run message segment with an iteration.

The command data sub-type message segment further includes a current segment number field 132 and a maximum segment number field 133 which identifies its position in the set of segments comprising the message. In addition, the message segment includes a command response time field 134 and a transaction response time field 135, in which the client node 10 transmits the contents of fields 64 and 65 of the transaction control block 25 (FIG. 5) related to the transaction. Finally, the message segment includes a command data field 136, in which the client node transmits the contents of a command buffer 26 and data buffer 28, if any, identified by the transaction control block 25 related to the transaction.

Figure 6F:
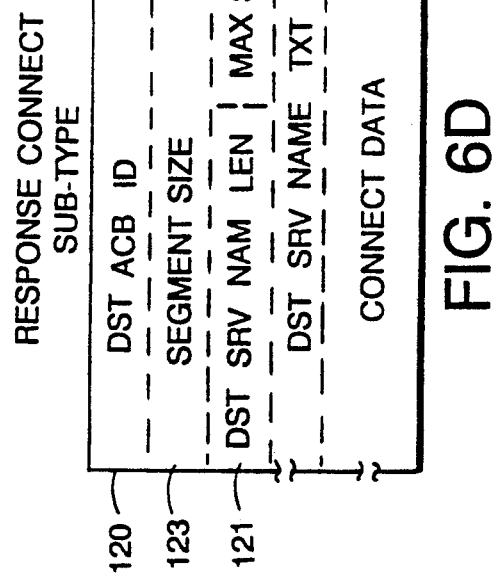

In response to a command message comprising one or more run message segments of the command data sub-type, the server node generates a response message comprising one or more run message segments of the response data sub-type. The contents of the run message information field 104 (FIG. 6B) of such a message segment are depicted in FIG. 6F. With reference to FIG. 6F, the message segment includes fields 140 through 143, which contain information similar to that contained in fields 130 through 133 (FIG. 6E). In addition, the message segment includes a transaction timer field 144, in which the server node 11 includes the contents of the timer field 67 in its transaction control clock 25, and a response data field 145 in which it transmits data, if any generated in response to the command.

Figures 1, 7A:
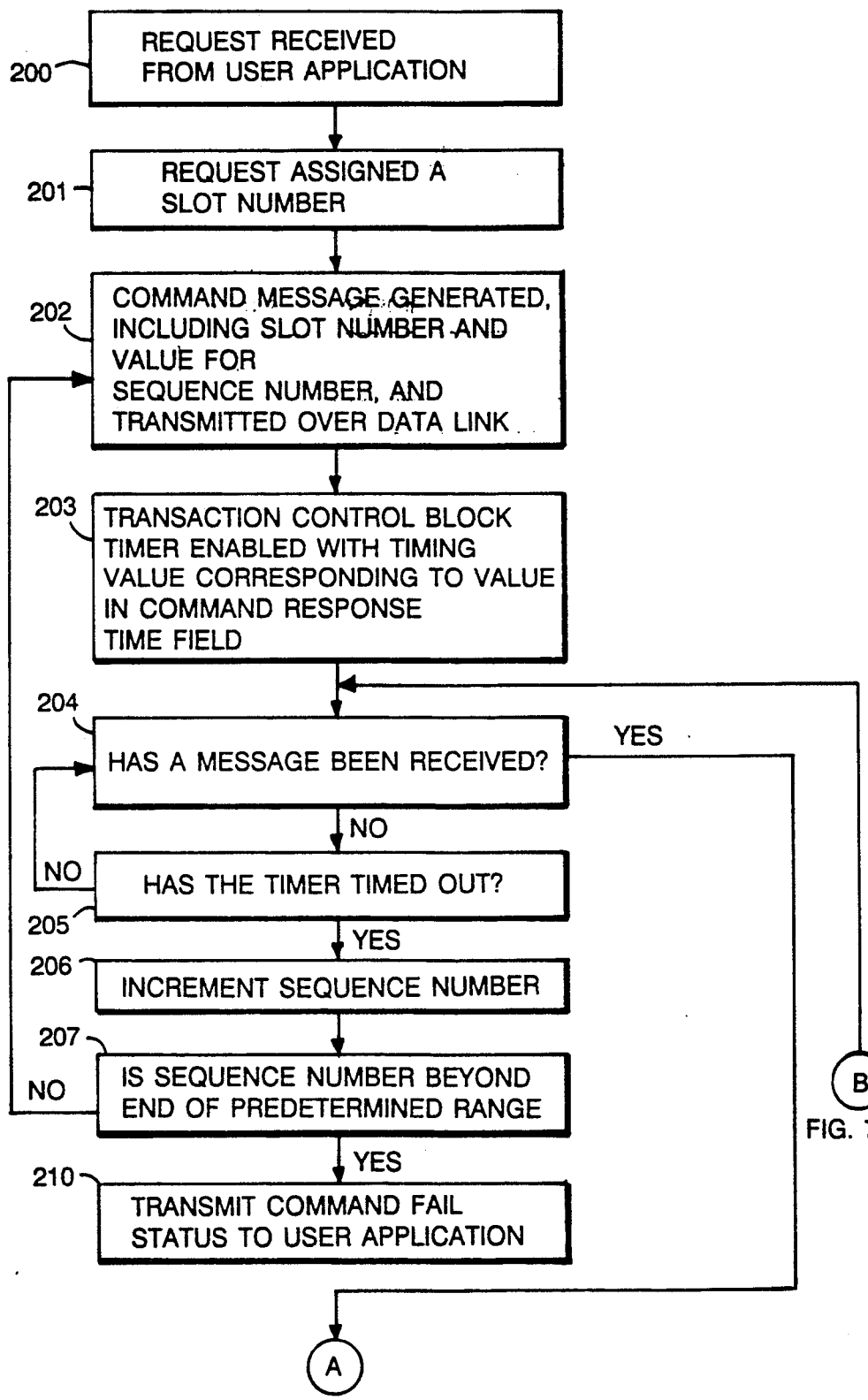
Figures 2, 7A:
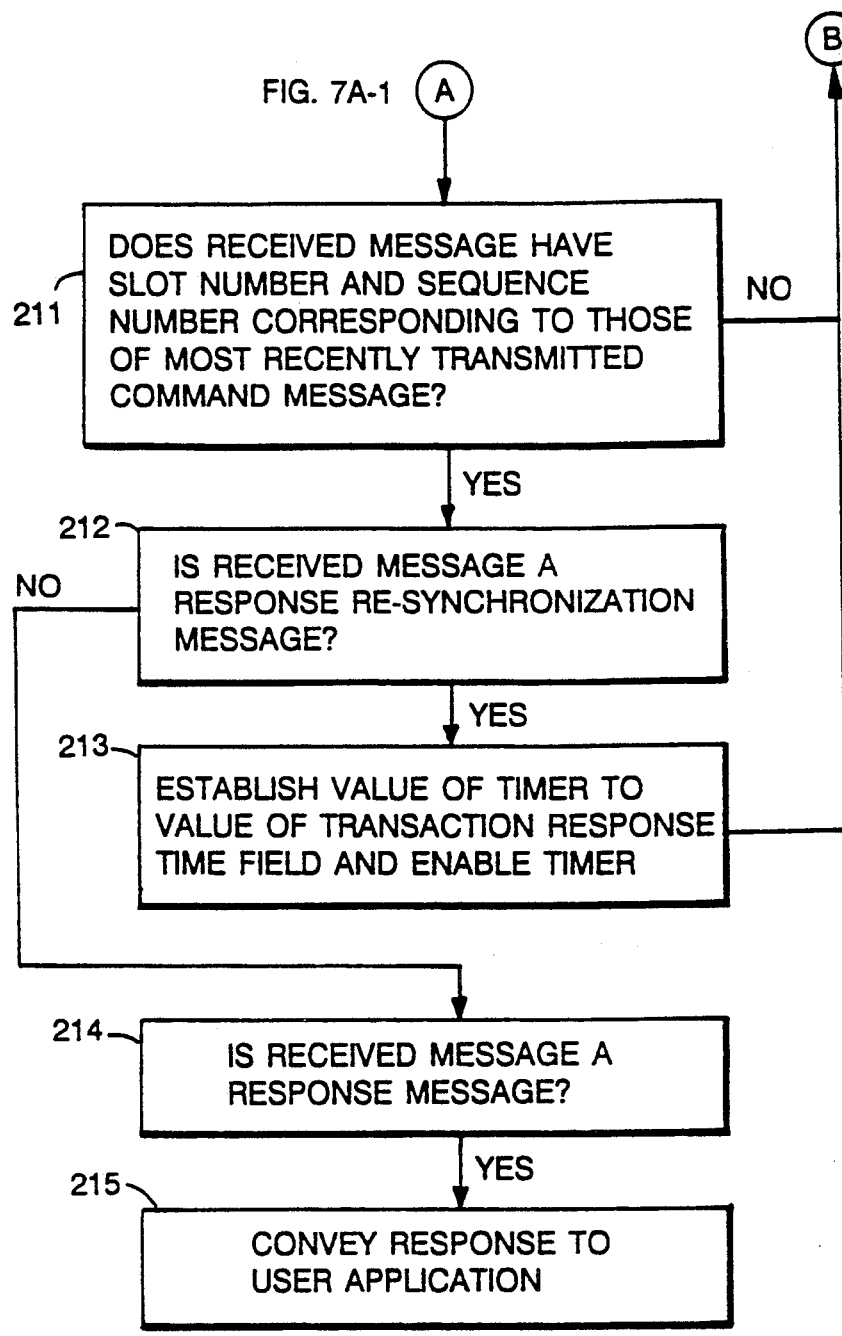
Figure 7B:
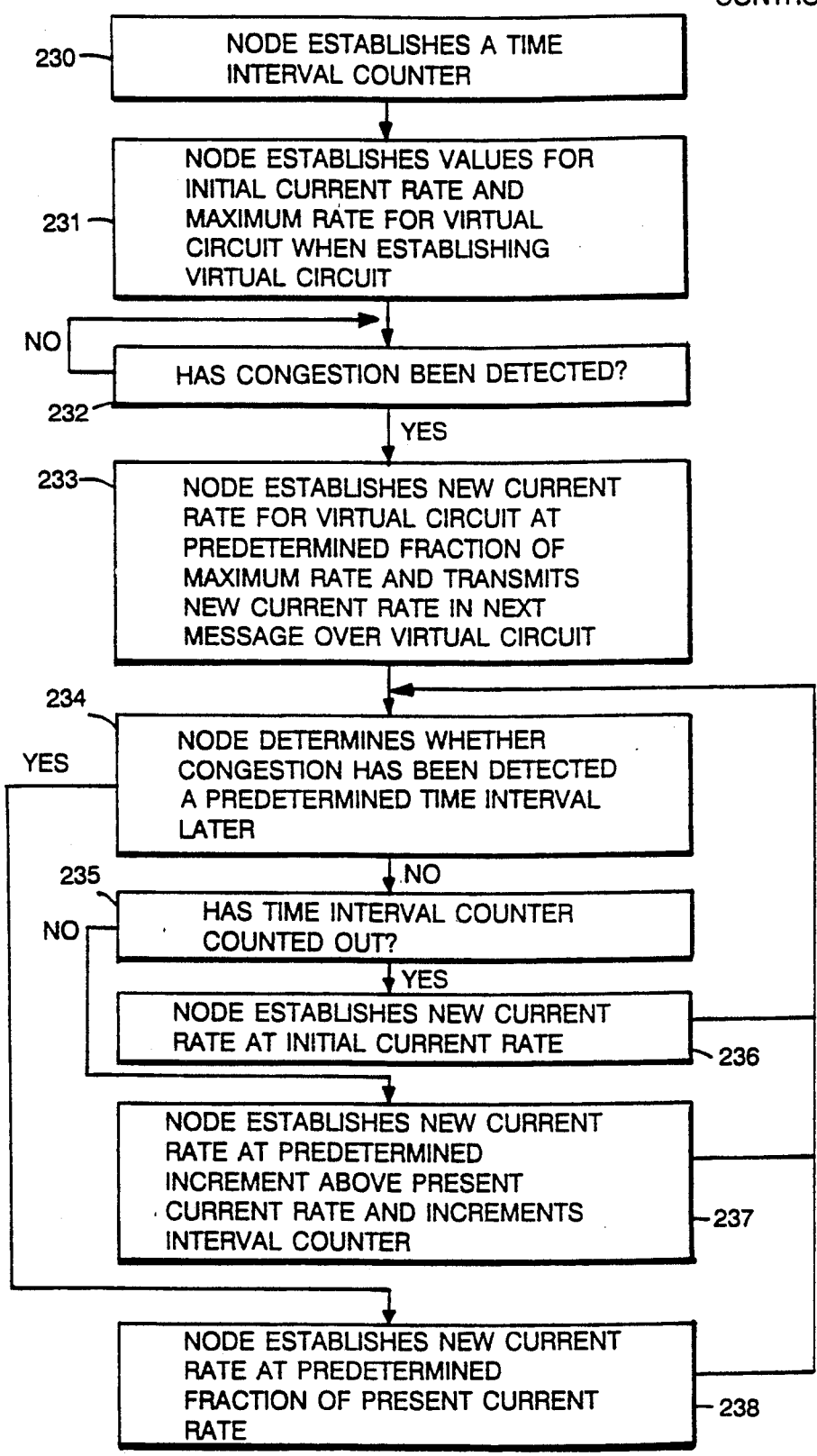

The operations of the client nodes 10 and server nodes 11 will be further described in connection with FIGS. 7A-1 through 7B. FIGS. 7A-1 and 7A-2 depict the operations of the client nodes 10 in connection with transmission of command messages following receipt of a request from a user application 14, particularly describing the operations in connection with the slot numbers and sequence numbers of the transmitted command messages and the received response messages. FIG. 7A-2 depicts the operations of the server nodes in connection with execution of commands specified in command messages, also particularly describing the operations in connection with the slot numbers and sequence numbers of the received command messages. FIG. 7B depicts the operations of the nodes in connection with the detection and control of congestion in connection with messages transmitted over the data link 12.

With reference to FIG. 7A-1, the client node 10, and particularly, the users layer 30, first receives a request from a user application 14 (step 200). The users application establishes a command buffer 26 for the command and a data buffer 28, if necessary, for data related to the command, either data to be transmitted with command messages or in which data received with response messages is to be stored. The users layer 30 thereafter notifies the association layer 22 of the receipt of the request.

Upon receiving notification of the request from the users layer 25, the association layer 22 determines the service requested in the request, and if it has an association established for the service. If not, it establishes an association, and, if necessary, a circuit, including a related association control block 23 and circuit status block 21, as described above. If an association and circuit have been established, the association layer 22 determines whether the transaction queue 24 for the association has an empty slot. If so, it establishes a transaction control block 25 for the request and links it to the transaction queue 24, contemporaneously assigning the request a slot number (step 201).

When the request becomes the first in the transaction queue, the association layer 22 and circuit layer 20 jointly generate a command message for the request. The command message includes the slot number and an initial value of a sequence number. The association layer 22 divides the command message into command message segments, which are transmitted by the interface 19 over the data link 12 to the server node 11 to execute the command (step 202). Contemporaneously, the association layer 22 copies the contents of the command response time field 64 (FIG. 5) into the transaction timer field 67, and enables it to decrement (step 203).

The client node 10 thereafter waits for a message from the data link 12, specifically from the server node to which it transmitted the command message (step 204). The association layer decrements the contents of the transaction timer field, and if the contents are decremented to a predetermined time-out value (step 205), the association layer prepares to transmit another command message related to the same user application request. In that process, the association layer increments the sequence number (step 206), and determines whether the incremented sequence number is beyond a predetermined retry range (step 207). If so, the application layer 22 reports a command fail status to the user application 14 (step 210) using the response buffer 27 for the transaction as identified in the transaction control block 25. On the other hand, if the application layer 22 determines in step 207 that the incremented sequence number is not beyond the predetermined retry range, it sequences to step 202 to transmit another command message using the incremented sequence number.

If, in step 204, the client node has received a message before the transaction timer times out, the association layer sequences to step 211 (FIG. 7A-2). In step 211, the association layer determines whether the received message has a slot number and sequence number corresponding to those in the most recently transmitted command message for the association. If not, the received message is ignored, and the association layer returns to step 204 to wait for another message or for the transaction timer to time out.

If, in step 211, the association layer 22 determines that the received message has a slot number and sequence number corresponding to those in the most recently transmitted command message for the association, it first determines the type of received message. If the received message is a response re-synchronization message (step 212), it resets the transaction timer to the value of the transaction response time field 65 (FIG. 5) and enables it to operate (step 213), after which it sequences to step 204 to wait for another message or for the transaction timer to time out.

On the other hand, if the message received in step 211 is a response message (step 214), the association layer 22 conveys the response to the response buffer 27 and data buffer 28, as appropriate (step 215). The association layer then notifies the users layer 30 of the receipt of the response, which, in turn, notifies the user application 14. The user application 14 may retrieve the response and data from the respective buffers 27 and 28.

The operations of the server node 11, in response to the receipt of message segments comprising a command message are determined by the message's circuit identification, including the incarnation value, association, slot number and sequence number. The server node 11 uses the slot number of the command message to identify the slot of the association with respect to which the command message is related. Upon identifying the slot, the server node 11 compares the sequence number of the command message to the sequence number of the command message containing the previously-executed command for the same slot. If the sequence number of the command message is greater than the sequence number of the command message containing the previously-executed command for the slot, the server node 11 executes the command and generates and transmits message segments comprising a response message therefor. On the other hand, if the server node 11 determines that sequence number of the command message for the slot is the same or less than the sequence number of the command message containing the previously-executed command for the same slot, it ignores the command message and, instead, waits for the next command message for the slot.

It will be appreciated that the use of the slot numbers and sequence numbers facilitates synchronization of command messages and response messages as between the client node 10 and server node 11. The slot number uniquely identifies each request made by a user application and all possible transmissions of command messages relating to the request by the client node 10, and therefore associates a sequence of command messages to a particular request from a user application 14. Similarly, the sequence number uniquely identifies successive command messages in a sequence of command messages relating to the same request. By requiring the slot number and sequence number in a response message to match the slot number and sequence number of the most recently transmitted command message before transmitting a command message relating to the next request from a user application, the client node 10 ensures that the server node 11 will not execute delayed command messages after the client node 10 has notified the user application 14 that the request has been serviced at least once successfully. Thus, the client node 10 can ensure that the operations of the server node 11 with respect to one command will not continue after the user request completes successfully.

Similarly, by limiting the server node 11 to only executing a command message if the sequence number is greater than the sequence number of the previously executed command message, the server node 11 ensures that it does not execute a command message that has been delayed in transmission over the data link 12.

The operations performed by a node, either by a server node 11 or by a client node 10, in connection with controlling congestion in connection with messages received thereby, are depicted in FIG. 7B. The client node 10 and server node 11 are effectively connected by a circuit that consists of one or more paths, each path being defined by a pairing of an interface 19 in a client node 10 and an interface 19 in a server node 11 which are connected to the same data link 12. Congestion detection is based on an indication that an interface 19 has discarded a message segment, which it may do as a result of insufficient resources elsewhere in the node to receive it. Thus, a node may experience congestion in connection with one interface which it has implemented with a node, but not in connection with other interfaces which it has implemented with the same node.

With reference to FIG. 7B, when a server node 11 and client node 10 are initially establishing a circuit as described above, they establish an initial current message transfer rate and a maximum message transfer rate, which are communicated by means of start messages as described above (step 231). The initial current message transfer rate may, for example, be a very large value (effectively infinite) and the maximum message transfer rate may be based on the maximum rate at which other node involved in the circuit can transmit message segments. In addition, the node establishes a time interval counter (step 230) which counts time intervals after congestion has been detected (as described below).

While the node is receiving messages segments through its various interfaces, it continually determines whether the message segments are arriving at a satisfactory rate, or if they are being received at a rate so fast that it may not be able to satisfactorily process them. If the rate at which message segments are being received through the interface is so fast that the node may not be able to process them, the node determines that it has detected a congestion situation (step 233). When the node detects congestion, it establishes a new current message transfer rate at a selected fraction of the maximum message transfer rate (step 233). The node transmits the source receive rate value and the destination receive rate value in the fields 94 and 95 and sets the flag 93 in the circuit header 81 (FIG. 6A). The node receiving the message segment with the flag 93 set use the source receive rate value as the rate at which it may transmit messages to that interface of the node which transmitted the message segment.

The node receiving the message segment through a specific interface, regardless of the value of flag 93, will note in the destination receive rate value field 95 the rate at which the transmitting node is sending message segments to that interface 19. The receiving node will use the value in the destination receive rate value field 95 in determining when it should set flag 93 in message segments that it transmits from that interface. It will be appreciated that, once a node learns the rate at which it may transmit messages, it apportions that rate among all of its interfaces transmitting to that node.

Thereafter, if the node determines that congestion abates, it may gradually increase the current message transfer rate to permit the other nodes to increase the rates at which they may transmit messages to its interface. Specifically, if the node determines that, at a predetermined time interval after the congestion has been detected, congestion has abated (step 234), if the time interval counter has not counted out (step 235), the node establishes a new current rate at a predetermined increment above the present current rate and increments the time interval counter (step 237). The node communicates the new current rate to the other nodes in the same manner as described above. The node then returns to step 234, and again determines, a predetermined time interval later, whether the congestion is still abated.

If congestion remains abated, the node performs the sequence of steps 234, 235 and 237 until the time interval counter counts out, at which point the node sequences to step 236 to establish a new current rate at the initial current rate, which the node communicates to the other nodes as described above. Thus, while congestion remains abated, the node increases the current rate gradually, by repeating step 237, until a predetermined number of time intervals have passed, the number of time intervals being determined by the time interval counter. After the predetermined number of time intervals have passed during which congestion has been abated, the node returns the current rate to its initial current rate value (in step 236).

If, however, during step 234, the node again detects congestion, it again reduces the current rate. Specifically, if the node detects congestion in step 234, it sequences to step 238 during which it establishes a new current rate at a predetermined fraction of the present current rate, and communicates the new current rate to the other nodes as described above. The node then returns to step 234, at which it may again detect congestion and sequence to step 238 to reduce the current rate, or not detect congestion and perform steps 235 to 237 to increase the current rate.

It will be appreciated that the mechanism depicted in FIG. 7B provides an adaptive adjustment of the current rate, at which the node will accept message segments from other nodes over each interface. The mechanism facilitates adjustments based on instantaneous message reception conditions as experienced by the node.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system that includes a client node and a server node for exchanging messages over a communication link, comprising
   said client node including
      a message generator for generating command messages and iteratively transmitting said command messages to said server node on said communication link each of said command messages including a sequence number that identifies said command message,
      a receiver for receiving corresponding response messages from said server node on said communication link, and
      said message generator including means for retransmitting another iteration of each said command message unless said receiver receives a response message that corresponds to said command message within a predetermined time interval, said message generator including means for changing the sequence number of the retransmitted command message to indicate that said retransmitted command message is another iteration of said command message,
   said server node including
      a processor for executing said command messages received from said client node via said communication link and generating said corresponding response messages, each said response message including a sequence number that corresponds to the sequence number of the iteration of the command message to which the response message corresponds,
      said receiver comprising means for comparing the sequence number included in each received response message with the sequence number included in a most recently transmitted command message, and determining to discard said response message unless said comparison indicates that said response message corresponds to the most recently transmitted iteration of said command message.

2. The system of claim 1 wherein said means for comparing determines to utilize said response message if said sequence number included in said received response message matches said sequence number of said most recently transmitted iteration of said command message.

3. The system of claim 2 wherein said command messages and said response messages relate to requests made by a user of said client node, each command message identifying said related request,
   said means for comparing determining to utilize a response message related to one of said requests if said sequence number of the response message matches the sequence number of the most recently transmitted command message related to said request.

4. The system of claim 1 wherein causing each of said command messages to be iteratively transmitted until said receiver receives a response message corresponding thereto from said server node, and for incrementing said sequence number of said command message in each iteration, and
   said means for comparing determining to utilize said response message if said sequence numbers match.

5. The system of claim 4 wherein said controller includes a timer for determining a time interval between said iterative transmissions of said command message, said controller transmitting an iteration of said command message unless said receiver receives a response message having said matching sequence number within said time interval.

6. The system of claim 5 wherein said processor includes
   a response timer for determining if a response to one of said command messages will require longer than said time interval, and
   a resynchronizer responsive to said response timer for transmitting a resynchronization response message that includes the sequence number of said command message to said client node to cause said controller to extend said time interval to temporarily prevent transmission of another iteration of said command message.

7. The system of claim 4 wherein each one of said command messages includes a field that identifies a command for execution by said processor to produce a result, at least some of said commands having a characteristic that iterative execution thereof does not change said result.

8. The system of claim 7 wherein at least some of said series of command messages include commands execution of which are commutative with execution of commands of other command messages of said series.

9. The system of claim 1 wherein said client node is adapted to receive multiple requests from a user, said message generator generating said series of command messages in response to said requests, each said command message being related to one of said requests and including: a request field that identifies said related request; and a sequence field that identifies said sequence number of said command message,
   said message generator comprising a controller for causing each of said command messages for each one of said requests to be iteratively transmitted until said receiver receives a response message corresponding to said request from said server node, said controller incrementing said sequence number in said sequence field in each iteration.

10. The system of claim 9 wherein said processor includes in each said response message: a request field that identifies the request to which the corresponding command message is related; and a sequence field that identifies the sequence number of said command message;

said means for comparing relating each said response message to one of said requests based on the request field thereof, and for comparing the sequence number identified by said sequence field with the sequence number of the previously transmitted command message for said request, said means for comparing determining to utilize said response message if said sequence numbers match.

11. The system of claim 10 wherein at least some of said response messages comprise a plurality of message segments, said processor additionally including in each response message segment a segment field that identifies said message segment in said plurality of message segments, said means for comparing monitoring said message segment field of received response message segments as a basis for determining whether a complete response message has been received.

12. A system that includes a client node and a server node for exchanging messages over a communication link comprising said client node including a message generator for generating command messages and iteratively transmitting said command messages to said server node on said communication link, each of said command messages including a sequence number that identifies said command message, a receiver for receiving corresponding response messages from said server node on said communication link, and said message generator including means for retransmitting another iteration of each said command message unless said receiver receives a response message that corresponds to said command message within a predetermined time interval, said message generator including means for changing the sequence number of the retransmitted command message to indicate that said retransmitted command message is another iteration of said command message, said server node including a processor for executing said command messages received form said client node via said communication link and generating said corresponding response messages, each said response message including a sequence number that corresponds to the sequence number of the iteration of the command message to which the response message corresponds, and an execution enabler for comparing the sequence number included in each command messages received by said server node with the sequence number included in a command message previously processed by said processor, and selectively enabling said processor to execute said command message when said comparison of said sequence number indicates that said command message received by said server node is not a previous iteration of said command message previously processed by said processor.

13. The system of claim 12 wherein said message generator comprises a controller for causing each of said command messages to be iteratively transmitted until said receiver receives a response message corresponding thereto from said server node, and for incrementing said sequence number of said command message in each iteration, and said execution enabler enabling said processor to execute said received command message if said sequence number of said received command message is greater than the sequence number of said most recent iteration.

14. The system of claim 13 wherein said execution enabler determines to execute said received command message if the sequence number of said received command message is within a predetermined range of sequence numbers greater than the sequence number of said previously executed command message.

15. The system of claim 13 wherein said controller includes a timer for determining a time interval between said iterative transmissions of said command message, said controller transmitting an iteration of said command message unless said receiver receives a response message having said matching sequence number within said time interval, and said processor includes a response timer for determining if a response to one of said command messages will require longer than said time interval, and a resynchronizer responsive to said response timer for transmitting a resynchronization response message that includes the sequence number of said command message to said client node to cause said controller to extend said time interval to temporarily prevent transmission of another iteration of said command message.

16. The system of claim 12 wherein said command messages relate to requests made by a user of said client node, each command message identifying said related request, said message generator incrementing the sequence numbers of successive command messages for each request, and said execution enabler determining to utilize said received command message if said sequence number of said received command message is greater than the sequence number of said most recently executed command message.

17. The system of claim 12 wherein said client node is adapted to receive multiple requests from a user, said message generator generating said series of command messages in response to said requests, each said command message being related to one of said requests and including: a request field that identifies said related request; and a sequence field that identifies said sequence number of said command message, said message generator comprising a controller for causing, each of said command messages for each one of said requests to be iteratively transmitted until said receiver receives a response message corresponding to said request from said serve node, said controller incrementing said sequence number in said sequence field in each iteration.

18. The system of claim 17 wherein said execution enabler compares the sequence number identified by said request field with the sequence number of the command message for said request that has most recently been executed by said processor, and determines to utilize said received command message if said sequence number of said received command message is greater than the sequence number of said most recently executed command message.

19. The system of claim 18 wherein said controller increments said sequence number over a predetermined range, said execution enabler determining to utilize said received command message if said sequence number of said received command message is greater than the sequence number of said most recently executed command message by up to a predetermined amount within said range.

20. The system of claim 19 wherein at least some of said command messages comprise a plurality of message segments and include a segment field that identifies each message segment in said plurality of message segments,
said execution enabler monitors said message segment field of each received command message segment as a basis for determining whether a complete command message has been received.

21. The system of claim 12 wherein each one of said command messages includes a field that identifies a command for execution by said processor to produce a result, at least some of said commands having a characteristic that iterative execution thereof does not change said result.

22. The system of claim 21 wherein at least some of said series of command messages include commands execution of which are commutative with execution of commands of other command messages of said series.

23. A system that includes a client node and a server node for exchanging messages over a communication link, comprising
said client node including
a message generator for generating command messages and iteratively transmitting said command messages to said server node on said communication link, each of said command messages including a sequence number that identifies said command message,
a receiver for receiving corresponding response messages from said server node on said communication link, and
said message generator including means for retransmitting another iteration of each said command message unless said receiver receives a response message that corresponds to said command message within a predetermined time interval, said message generator including means for changing the sequence number of the retransmitted command message to indicate that said retransmitted command message is another iteration of said command message,
said server node including
a processor for executing said command messages received from said client node via said communication link and generating said corresponding response messages, each said response message including a sequence number that corresponds to the sequence number of the iteration of the command message to which the response message corresponds, and
an execution enabler for comparing the sequence number included in each command message received by said server node with the sequence number included in a command message previously processed by said processor, and selectively enabling said processor to execute said command message when said comparison of said sequence numbers indicates that said command message received by said server node is not a previous iteration of said command message previously processed by said processor,
said receiver comprising means for comparing the sequence number included in each received response message with the sequence number included in a most recently transmitted command message, and determining to discard said response message unless said comparison indicates that said response message corresponds to the most recently transmitted iteration of said command message.

24. The system of claim 23 wherein said communication link includes a plurality of physical connections between said client node and said server node,
said client node further comprising an interface for transmitting different ones of said series of command messages to said server node over different ones of said physical connections, and receiving different ones of said response messages from said server node over different ones of said physical connections, and
said server node further comprising an interface for receiving said different command messages over said physical connections, and for transmitting said different response messages over said different physical connections.

25. The system of claim 23 further comprising a plurality of said client nodes and a plurality of said server nodes, the message generator of each one of said client nodes including in each said command message a destination field that identifies the server node to which said command message is being transmitted.

26. The system of claim 25 wherein said one of said server nodes is adapted to provide at least one data processing service for users of said client nodes,
each one of said server nodes further comprising a service message generator for broadcasting to said client nodes over said communication link a service message that identifies the at least one service provided by said server node,
each one of said message generators of said client nodes determining contents of said destination field based at least in part on the service messages from said server nodes.

27. The system of claim 23 wherein each one of said command messages includes a field that identifies a command for execution by said processor to produce a result, at least some of said commands having a characteristic that iterative execution thereof does not change said result.

28. The system of claim 27 wherein at least some of said series of command messages include commands execution of which are commutative with execution of commands of other command messages of said series.

29. A client node for use in a system in which one or more client nodes and at least one server node exchange messages over a communication link, said client node including
a message generator for generating command messages and iteratively transmitting said command messages on said communication link, each of said command messages including a sequence number that identifies said command message,
said message generator including means for retransmitting another iteration of each said command message when said client node does not receive a response message that corresponds to said command message within a predetermined time interval, said message generator including means for changing the sequence number of the retransmitted command message to indicate that said retransmitted command message is another iteration of said command message, and a receiver for receiving corresponding response messages from said server node via said communication link, each said response message including a sequence number that corresponds to the sequence number of the iteration of the command message with which said response message corresponds, said receiver comprising means for comparing the sequence number included in each received response message with the sequence number included in a most recently transmitted command message, and determining to discard said response message when said comparison indicates that said response message does not correspond to the most recently transmitted iteration of said command message.

30. A server node for use in a system in which at least one client node and one or more server nodes exchange messages over a communication link, said server node including a processor for executing command messages received from said client node via said communication link, each of said command messages including a sequence number that identifies said command message, said client node including means for retransmitting an iteration of each said command message when said client node does not receive a response message from said server node that corresponds to said command message within a predetermined time interval, and means for changing the sequence number of the retransmitted command message to indicate that said retransmitted command message is an iteration of said command message, said processor generating corresponding response messages and transmitting said response messages to said client node via said communication link, and including in each said response message a sequence number that corresponds to the sequence number of the iteration of the command message to which said response message corresponds, and an execution enabler for comparing the sequence number included in each command message received by said server node with the sequence number included in a command message previously processed by said processor, and selectively enabling said processor to execute said command message when said comparison of said sequence numbers indicates that said command message received by said server node is not a previously iteration of said command message previously processed by said processor.

31. A method of exchanging messages between a client node and a server node over a communication link, comprising said client node; (1) generating command messages and iteratively transmitting said command messages to said server node on said communication link, each of said command messages including a sequence number that identifies said command message, (2) receiving corresponding response messages from said server node on said communication link, and (3) retransmitting another iteration of each said command message when said client node receives a response message that does not correspond to said command message within a predetermined tim interval, said client node changing the sequence number of the retransmitted command message to indicate that said retransmitted command message is another iteration of said command message, said server node processing said command messages received from said client node via said communication link and generating said corresponding response messages, each said response message including a sequence number that corresponds to the sequence number of the iteration of the command message to which the response message corresponds, and said client node comparing the sequence number included in each received response message with the sequence number included in a most recently transmitted command message, and determining to discard said response message when said comparison indicates that said response messages does not correspond to the most recently transmitted iteration of said command message.

32. The method of claim 31 wherein said step of determining includes utilizing said response message if said sequence numbers match.

33. The method of claim 32 wherein said command messages and said response messages relate to requests made by a user of said client node, each command message identifying said related request, said step of determining including utilizing a response message related to one of said requests if said sequence number of the response message matches the sequence number of the most recently transmitted command message related to said request.

34. The method of claim 31 further comprising said client node incrementing said sequence number of said command message in each iteration, and said step of determining comprises utilizing said response message if said sequence numbers match.

35. The method of claim 34 further comprising transmitting an iteration of said command message unless said client node receives a response message having said matching sequence number within a predetermined time interval.

36. The method of claim 35 further comprising said server node determining if a response to one of said command messages will require longer than said time interval, and, if so, transmitting a resynchronization response message that includes the sequence number of said command message to said client node to cause said client node to extend said time interval to temporarily prevent transmission of another iteration of said command message.

37. The method of claim 34 wherein each one of said command messages includes a field that identifies a command for execution by said processor to produce a result, at least some of said commands having a characteristic that iterative execution thereof does not change said result.

38. The method of claim 37 wherein at least some of said series of command messages include commands execution of which are commutative with execution of commands of other command messages of said series.

39. The method of claim 31 wherein said client node receives multiple requests from a user and generates said series of command messages in response to said requests, each said command message being related to one of said requests and including: a request field that identifies said related request; and a sequence field that identifies said sequence number of said command message, said client node iteratively transmitting each of said command messages for each one of said requests until said client node receives a response message corresponding to said request from said server node, and incrementing said sequence number in said sequence field in each iteration.

40. The method of claim 39 wherein said server node includes in each said response message: a request field that identifies that the request to which the corresponding command message is related; and a sequence field that identifies the sequence number of said command message, said client node related each said response message to one of said requests based on the request field thereof, comparing the sequence number identified by said sequence field with the sequence number of the previously transmitted command message for said request, and determining to utilize said response message if said sequence numbers match.

41. The method of claim 40 wherein at least some of said response messages comprise a plurality of message segments, and further comprising said server node including in each response message segment a segment field that identifies said message segment in said plurality of message segments, and said client node monitoring said message segment field of received response message segments as a basis for determining whether a complete response message has been received.

42. A method of exchanging messages between a client node and a server node over a communication link, comprising said client node: (1) generating command messages and iteratively transmitting said command messages to said server node on said communication link, each of said command messages including a sequence number that identifies aid command message, (2) receiving corresponding response messages from said server node on said communication link, and (3) retransmitting another iteration of each said command message when said client node does not receive a response message that corresponds to said command message within a predetermined time interval, said client node changing the sequence number of the retransmitted command message to indicate that said retransmitted command message is another iteration of said command message, said server node processing said command messages received from said client node via said communication link and generating said corresponding response messages, each said response message including a sequence number that corresponds to the sequence number of the iteration of the command message to which the response message corresponds, and said server node comparing the sequence number included in each command message received by said server node with the sequence number included in a command message previously processed by said processor, and selectively enabling said processing of each said command message when said comparison of said sequence numbers indicates that said command message received by said server node is not a previous iteration of said command message previously processed by said processor.

43. The method of claim 42 further comprising said client node incrementing said sequence number of said command message in each iteration, and said serve node utilizing said received command message if said sequence number of said received command message is greater than the sequence number of said most recent iteration.

44. The method of claim 43 further comprising determining to execute said received command message if the sequence number of said received command message is within a predetermined range of sequence numbers greater than the sequence number of said previously executed command message.

45. The method of claim 43 further comprising said client node transmitting an iteration of said command message unless said client node receives a response message having said matching sequence number with in a predetermined time interval, and said server node determining if a response to one of said command messages will require longer than said time interval, and, if so, transmitting a resynchronization response message that includes the sequence number of said command message to cause said client node to extend said time interval to temporarily prevent transmission of another iteration of said command message.

46. The method of claim 42 wherein said command messages relate to requests made by a user of said client node, each command message identifying said related request, and further comprising said client node incrementing the sequence numbers of successive command messages for each request, and said server node comparing the sequence number of a received command message related to one of said requests t the sequence number of the command message for said request that has most recently been executed, and utilizing said received command message if said sequence number of said received command message is greater than the sequence number of said most recently executed command message.

47. The method of claim 42 wherein said client node receives multiple requests from a user and generates said series of command messages in response to said requests, each said command message being related to one of said request and including: a request field that identifies said related request; and a sequence field that identifies said sequence number of said command message, said client node iteratively transmitting each of said command messages for each one of said requests until said client node receives a response message corresponding to said request from said server node, and incrementing said sequence number in said sequence field in each iteration.

48. The method of claim 47 further comprising the steps of said server node relating each received command message to one of said requests based on the request field thereof, comparing the sequence number identified by said request field with the sequence number of the command message for said request that has most recently been executed, and utilizing said received command message if said sequence number of said received command message is greater than the sequence number of said most recently executed command message.

49. The method of claim 48 wherein said client node increments said sequence number over a predetermined range, said serve node determining to utilize said received command message if said sequence number of said received command message is greater than the sequence number of said most recently executed command message by up to a predetermined amount within said range.

50. The method of claim 49 wherein at least some of said command messages comprise a plurality of message segments and include a segment field that identifies each message segment in said plurality of message segments, and further comprising said server node monitoring said message segment field of each received command message segment as a basis for determining whether a complete command message has been received.

51. The method of claim 42 wherein each one of said command messages includes a field that identifies a command for execution by said processor to produce a result, at least some of said commands having a characteristic that iterative execution thereof does not change said result.

52. The method of claim 51 wherein at least some of said series of command messages include commands execution of which are commutative with execution of commands of other command messages of said series.

53. A method of exchanging messages between a client node and a server node over a communication link, comprising said client node; (1) generating command messages and iteratively transmitting said command messages to said server node on said communication link, each of said command messages including a sequence number that identifies said command message, (2) receiving corresponding response messages from said server node on said communication line, and (3) retransmitting another iteration of each said command message when said client node does not receive a response message that corresponds to said command message within a predetermined time interval, said client node changing the sequence number of the retransmitted command message to indicate that said retransmitted command message is another iteration of said command message, said server node processing said command messages received from said client node via said communication link and generating said corresponding response messages, each said response message including a sequence number that corresponds to the sequence number of the iteration of the command message to which the response message corresponds, said server node comparing the sequence number included in each command message received by said server node with the sequence number included in a command message previously processed by said processor, said selectively enabling said processing of each said command message when said comparison indicates that said command message received by said server node is not a previous iteration of said command message previously processed by said processor, said client node comparing the sequence number included in each received response message with the sequence number included in a most recently transmitted command message, and determining to discard said responses message when said comparison indicates that said response message does not correspond to the most recently transmitted iteration of said command message.

* * * * *

UNITED STATES PATENT AND TRADEMARK OFFICE
CERTIFICATE OF CORRECTION

PATENT NO. : 5,167,035
DATED : Nov. 24, 1992
INVENTOR(S) : Mann, et al

It is certified that error appears in the above-indentified patent and that said Letters Patent is hereby corrected as shown below:

In the abstract; line 10, after "command" insert --messages--.

In the abstract; line 21, "commanmd" should be --command--.

Column 5, line 10, after "acknowledgement" insert --messages--.

Column 20, line 10, after "wherein" insert --said message generator comprises a controller for--.

Signed and Sealed this

Twelfth Day of April, 1994

*Attest:*

BRUCE LEHMAN

*Commissioner of Patents and Trademarks*

*Attesting Officer*